United States Patent
Johnson

(10) Patent No.: US 9,772,051 B2
(45) Date of Patent: Sep. 26, 2017

(54) WATERPROOFING WATER COMBINATIONS

(71) Applicant: Stephen Johnson, Narrabri (AU)

(72) Inventor: Stephen Johnson, Narrabri (AU)

( * ) Notice: Subject to any disclaimer, the term of this patent is extended or adjusted under 35 U.S.C. 154(b) by 0 days.

(21) Appl. No.: 15/364,698

(22) Filed: Nov. 30, 2016

(65) Prior Publication Data

US 2017/0082218 A1 Mar. 23, 2017

Related U.S. Application Data

(62) Division of application No. 14/411,210, filed as application No. PCT/AU2013/000696 on Jun. 27, 2013, now abandoned.

(30) Foreign Application Priority Data

| Jun. 29, 2012 | (AU) | ................................ 2012902795 |
| Nov. 29, 2012 | (AU) | ................................ 2012101756 |
| Apr. 11, 2013 | (AU) | ................................ 2013204010 |

(51) Int. Cl.
| *F16L 5/02* | (2006.01) |
| *E03C 1/02* | (2006.01) |
| *E04B 1/66* | (2006.01) |
| *E03C 1/04* | (2006.01) |

(52) U.S. Cl.
CPC ................. *F16L 5/02* (2013.01); *E03C 1/02* (2013.01); *E04B 1/66* (2013.01); *E03C 1/04* (2013.01)

(58) Field of Classification Search
CPC ...... F16L 5/02; E04B 1/66; E03C 1/02; E03C 1/04
See application file for complete search history.

(56) References Cited

U.S. PATENT DOCUMENTS

| 2,510,926 | A |   | 6/1950 | Goldstein |
| 3,813,708 | A |   | 6/1974 | Hamburg |
| 4,027,094 | A | * | 5/1977 | Philips .................... H02G 3/185 174/485 |
| 4,120,129 | A | * | 10/1978 | Nagler ................ E04D 13/1407 285/4 |
| 4,621,937 | A | * | 11/1986 | Maccuaig ............... B60T 11/04 285/192 |
| 5,027,665 | A | * | 7/1991 | Hayward ................. F16J 3/045 138/109 |

(Continued)

FOREIGN PATENT DOCUMENTS

| AU | 514247 B2 | 1/1981 |
| AU | 2002300670 B2 | 6/2003 |

(Continued)

*Primary Examiner* — Jeanette E Chapman
(74) *Attorney, Agent, or Firm* — Harness, Dickey & Pierce, P.L.C.

(57) ABSTRACT

The present invention relates generally to a system for waterproofing a wall 7 having a wall opening through which a water combination 6 extends. The system comprises a sleeve 1 including a collar 12 having a resiliently flexible portion adapted to expand to fit about the water combination 6. The waterproofing system also comprises a coupling element 3 separate from the sleeve 1. The coupling element 3 is arranged to seal to the sleeve 1 and the wall 7 or associated tiles 8 to which the water combination 6 is mounted.

7 Claims, 8 Drawing Sheets

(56) References Cited

U.S. PATENT DOCUMENTS

Figure 1:
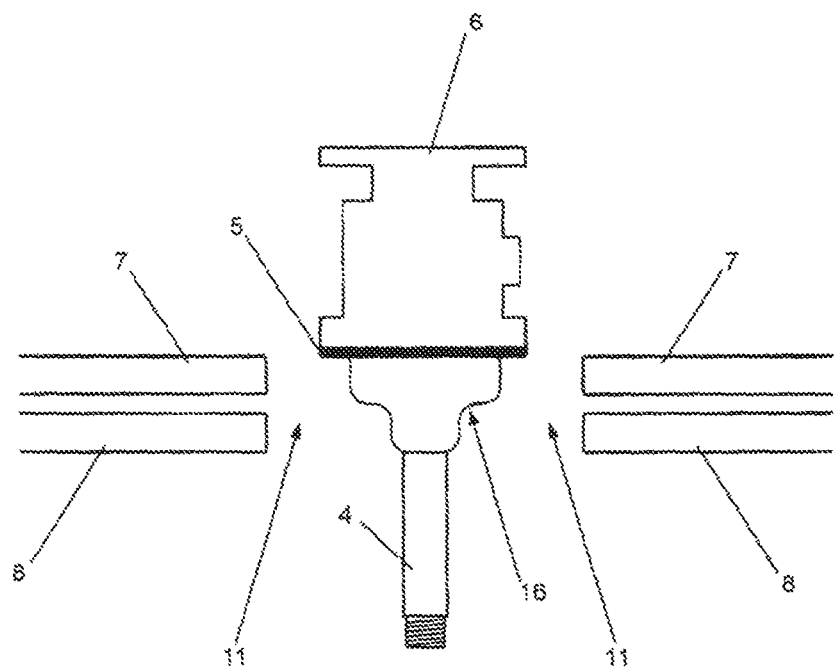

| | | | | |
|---|---|---|---|---|
| 5,182,885 | A | * | 2/1993 | Barton, Jr. ............ E04G 15/061 |
| | | | | 138/155 |
| 5,347,776 | A | | 9/1994 | Skoff |
| 5,390,465 | A | | 2/1995 | Rajecki |
| 5,704,656 | A | * | 1/1998 | Rowe ...................... F16L 5/02 |
| | | | | 285/139.3 |
| 5,799,988 | A | | 9/1998 | Yeh |
| 5,971,444 | A | | 10/1999 | Hawkins |
| 6,279,272 | B1 | | 8/2001 | Nill |
| 6,792,726 | B1 | | 9/2004 | Price |
| 7,759,084 | B2 | * | 7/2010 | Nakajima ............ C12N 9/1223 |
| | | | | 435/15 |
| 8,813,336 | B1 | | 8/2014 | Cornwall |
| 8,845,406 | B2 | | 9/2014 | McIver |
| 2010/0187815 | A1 | * | 7/2010 | Theberath ........... F16L 33/2076 |
| | | | | 285/256 |
| 2014/0304901 | A1 | | 10/2014 | Salzer |
| 2015/0218799 | A1 | * | 8/2015 | Coscarella ............ E04L 31/625 |
| | | | | 52/404.1 |

FOREIGN PATENT DOCUMENTS

| | | | |
|---|---|---|---|
| CN | 2888220 | | 4/2007 |
| DE | 3430902 | A1 * | 3/1986 |
| DE | 4242235 | C1 | 3/1994 |
| EP | 0821192 | A2 | 1/1998 |
| JP | 2007272549 | A | 10/2007 |

* cited by examiner

WATERPROOFING WATER COMBINATIONS

FIELD OF THE INVENTION

The present invention relates generally to a waterproofing method and, in particular, to a method for waterproofing a wall with a wall opening through which a water combination extends.

BACKGROUND OF THE INVENTION

When building or renovating a property, waterproofing in wet areas such as the bathroom and the kitchen is essential. Typically, when a wall board or wall lining is installed, for example by a plasterer, a wall opening is created in the wall board or wall lining in order for a penetration member, such as a water combination, to extend from behind the wall to the front of the wall. If tiles are to be laid, a tiler may tile the wall board or wall lining around the penetration member, leaving a similar sized hole as the wall opening for the penetration member to extend through the tiled wall.

A common method of waterproofing a tiled or non-tiled wall with such a wall opening is to apply a sealing agent to fill the gap between the wall and the penetration member. There are however several disadvantages. Firstly, a large amount of sealant is often required to be applied. This is because the wall opening created is usually substantially larger than the cross section of the penetration member. For example, in case of a plasterboard wall, the wall opening is typically created with a hammer without much care and regard to the size and shape of the wall opening, thereby leaving a large gap to be filled. Furthermore, the wall opening so created usually has a rugged outline and surface, rendering it difficult to apply the sealant on the rugged surface of the wall.

Secondly, if the penetration member includes a tap spindle ratably coupled to a non-rotating body, the sealant when set would prevent the body from being able to be removed or replaced, for example for repair or maintenance purposes, unless the set sealant which initially fills the gap is subsequently removed. In the process of removing the set sealant, there is often unintended damage to the wall board or wall lining and/or the surrounding tile or tiles. Accordingly, if the tap spindle or any components of a water combination needs repair or replacement, not only does it require significant work to remove such an existing waterproofing arrangement, but there is also a risk of causing damage to the surrounding wall and tile work.

SUMMARY OF THE INVENTION

According to a first aspect of the invention there is provided a method for waterproofing a wall having a wall opening through which a water combination extends, the method comprising the steps of:
   fitting a sleeve including a resiliently flexible and integral collar to the water combination, the integral collar being:
   (i) inserted through the wall opening; and
   (ii) expanded to fit about the water combination;
   adjusting the sleeve by trimming or cutting the sleeve substantially flush with the wall;
   fitting a coupling element including an annular flange, separate from the sleeve, to the sleeve;
   aligning the annular flange with a surface of the wall;
   sealing the annular flange to the surface of the wall.

Preferably the step of fitting a coupling element involves sealing the coupling element to the sleeve.

Preferably the step of fitting a coupling element involves fitting a flange return of the coupling element inside the sleeve. More preferably the method also comprises the step of trimming or cutting the flange return, depending on a length to which the sleeve is adjusted, prior to fitting the flange return of the coupling element inside the sleeve.

According to a second aspect of the invention there is provided a method for waterproofing a wall having a wall opening through which a water combination extends, the method comprising the steps of:
   fitting a sleeve including a resiliently flexible and integral collar to the water combination, the integral collar being:
   (i) inserted through the wall opening; and
   (ii) expanded to fit about the water combination;
   fitting a coupling element including an annular flange, separate from the sleeve, to the sleeve;
   aligning the annular flange with a surface of the wall;
   sealing the annular flange to the surface of the wall;
   adjusting the sleeve by trimming or cutting the sleeve substantially flush with the wall.

Preferably the step of fitting a coupling element involves sealing the coupling element to the sleeve.

Preferably the step of fitting a coupling element involves fitting a flange return of the coupling element outside the sleeve.

BRIEF DESCRIPTION OF THE ACCOMPANYING DRAWINGS

Figure 2:
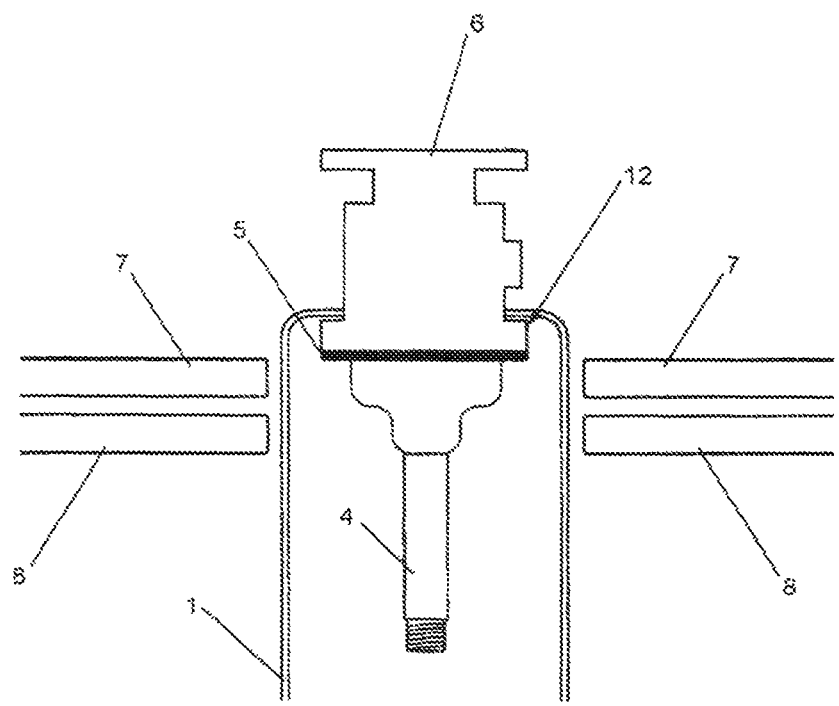
Figure 3:
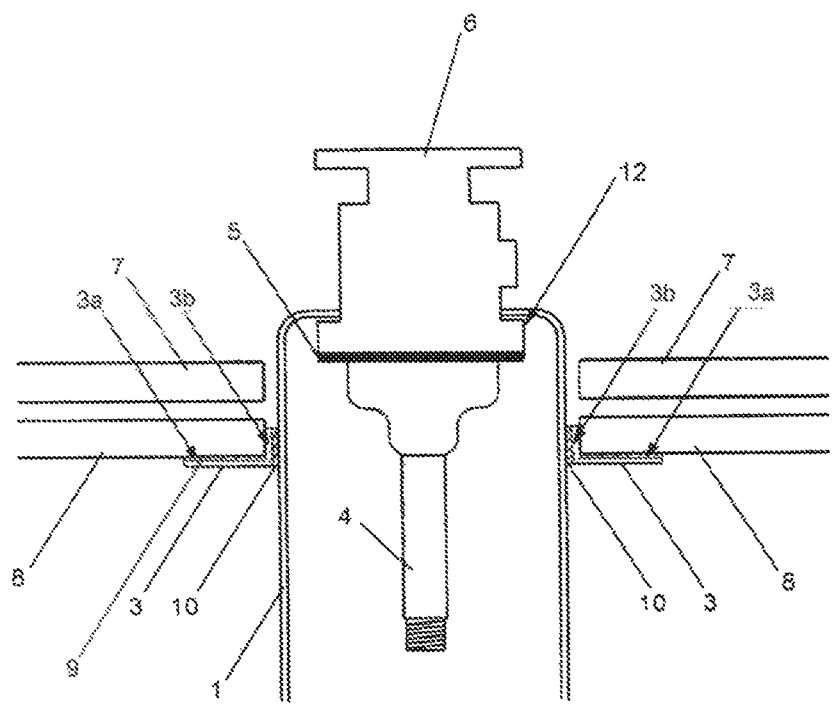
Figure 4:
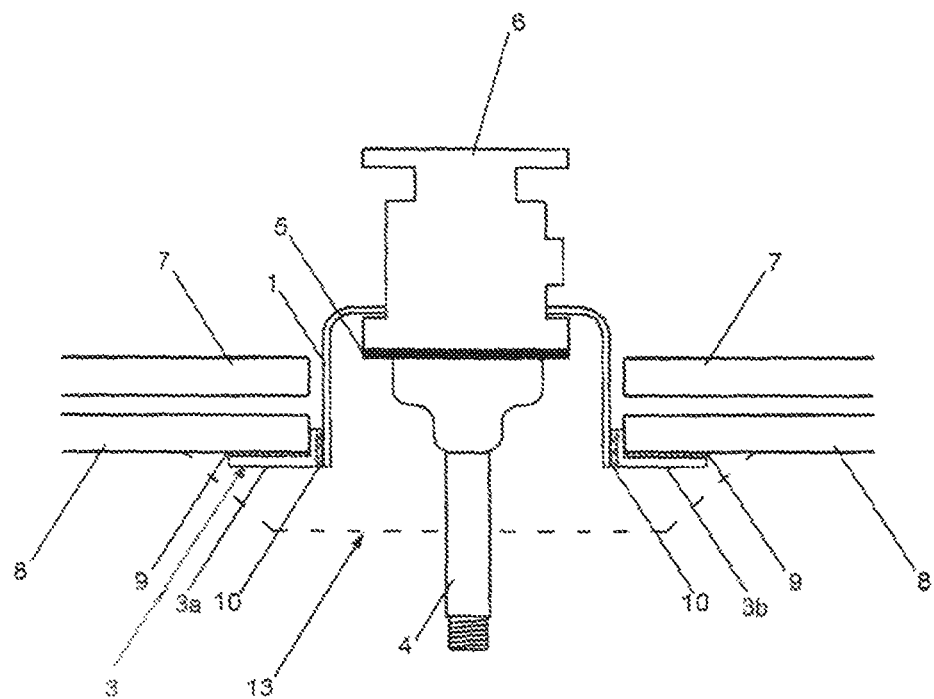
Figure 5:
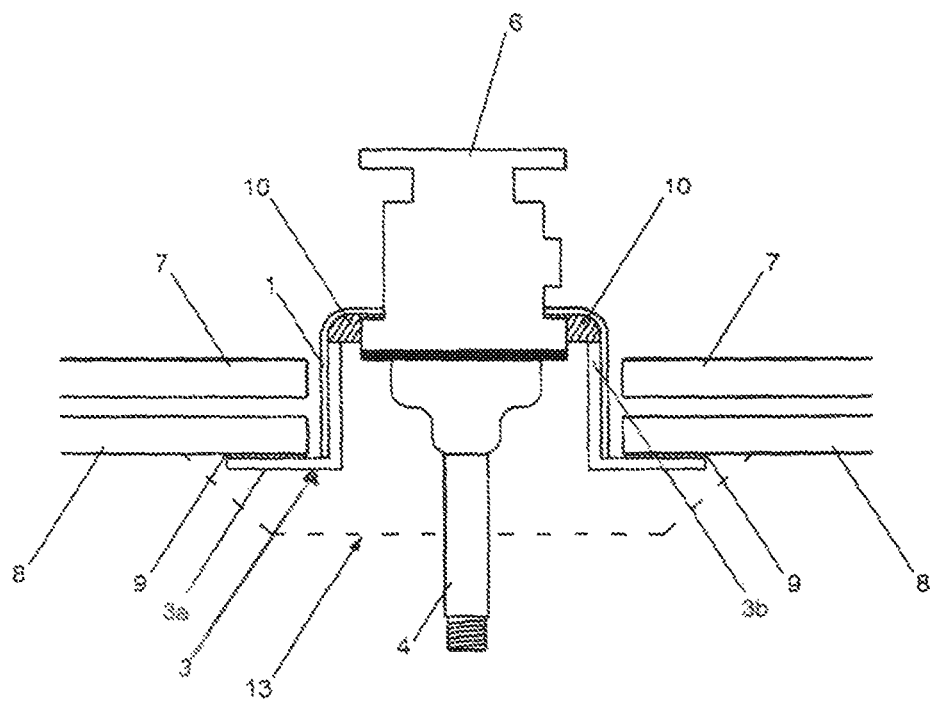
Figure 6:
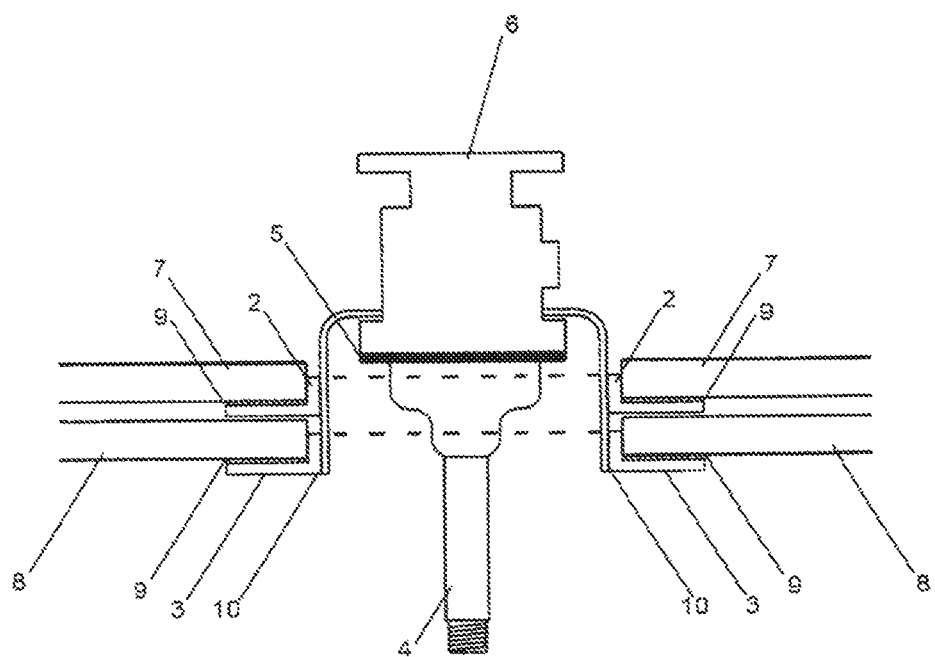
Figure 7:
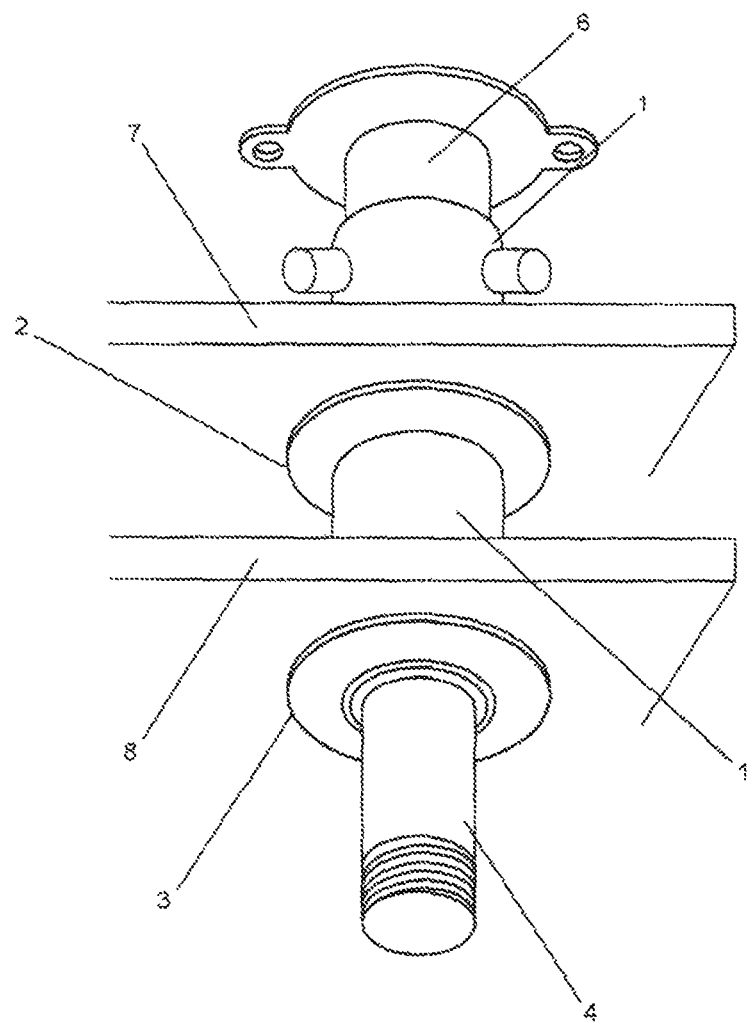
Figure 8A:
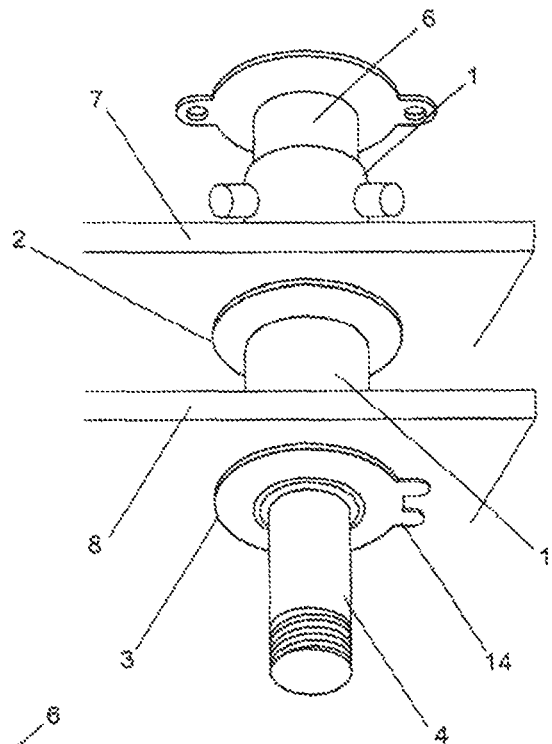
Figure 8B:
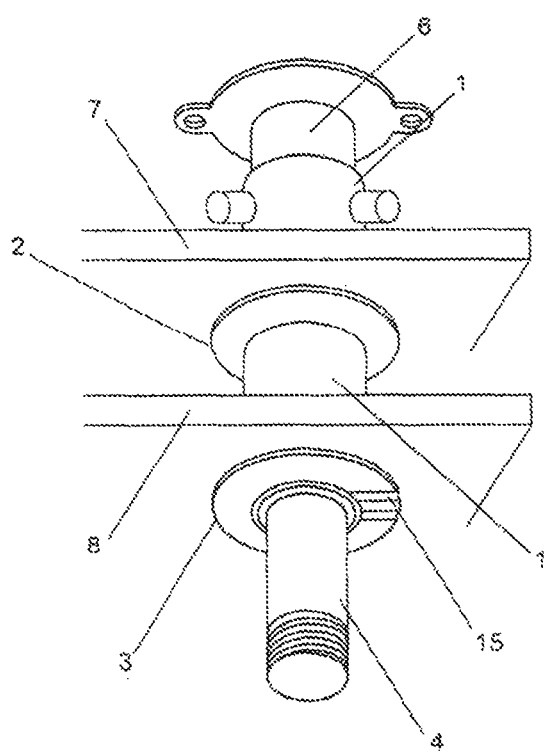

FIG. 1 A cross-sectional view of a water combination extending from behind a tiled wall;

FIG. 2 A cross-sectional view illustrating an example of a sleeve of an embodiment of the waterproofing system;

FIG. 3 A cross-sectional view illustrating an example of a coupling element of the embodiment of the waterproofing system shown in FIG. 2;

FIG. 4 A cross-sectional view illustrating the embodiment of the waterproofing system shown in FIG. 2 with a cut or trimmed sleeve;

FIG. 5 A cross-sectional view illustrating another embodiment of the waterproofing system;

FIG. 6 A cross-sectional view illustrating yet another embodiment of the waterproofing system;

FIG. 7 A perspective view of the embodiment of the waterproofing system shown in FIG. 6;

FIG. 8*a* A perspective view of a further embodiment of the waterproofing system with lugs or tabs; and FIG. 8*b* A perspective view of yet a further embodiment of the waterproofing system with depressed channel.

DETAILED DESCRIPTION OF THE PREFERRED EMBODIMENT(S)

FIG. 1 shows an example of a penetration member 6 extending from behind a vertical tiled wall comprising wall board or lining 7 and tile(s) 8. As shown, a wall opening has been created in the wall board or lining 7 and the tile(s) 8 through which the penetration member 6 extends. The wall board or lining 7 may be, for example, plasterboard, greenboard or cement board.

In the example illustrated in FIG. 1, the penetration member 6 is a water combination. In other cases, the penetration member may be other water-carrying or non-water-carrying conduits.

In this example, the water combination 6 includes a non-rotating body 16, a tap spindle 4 rotatably coupled to the body 16 and an O-ring or body washer 5. As noted in the Background, a common way to waterproof this portion of the tiled wall is to fill the gap 1 1 between the penetration member 6 and the wall board or lining 7 and the tiles 8 with a sealing agent, such as a silicone sealant or any other sealant. Since the gap 1 1 tends to be significantly larger than the cross section of the penetration member 6, a large amount of sealing agent is typically used. Furthermore, once the gap 1 1 is filled with the sealing agent and the sealing agent is set, the body 16 cannot be easily removed unless the set sealing agent is removed. One situation in which the body 16 needs to be removed may be when the O-ring or body washer 5 fails and needs repair or replacement. Another situation may be when a jumper valve in the water combination fails and needs repair or replacement. In such or similar situations, removing the sealing agent will also risk damage to the wall and surrounding tile work.

The present invention aims to alleviate at least some of these disadvantages. The present invention generally provides a system and a method for waterproofing a wall having a wall opening through which a penetration member extends.

In its most general form, the system in accordance with a first aspect of the present invention comprises (a) a sleeve being adapted to fit to the penetration member and (b) a coupling element that is separate from the sleeve and is adapted to be sealed to the sleeve and adapted to be sealed to the wall. Also, in its most general form, the method in accordance with a second aspect of the present invention comprises the steps of fitting a sleeve to the penetration member, sealing a coupling element, which is separate from the sleeve, to the sleeve, and sealing the coupling element to the wall. These two aspects of the present invention are generally applicable to both tiled and non-tiled walls.

FIG. 2 illustrates the cross-section of an example of a sleeve 1 in use. In one embodiment, the sleeve 1 has a tubular form open at both ends. The sleeve 1 may include a sleeve engagement portion 12 for facilitating fitting the sleeve to a portion of the penetration member 6. As shown, the sleeve engagement portion 12 may be located at the sleeve's rear end or non-exposed end and the fitting between the sleeve engagement portion and the penetration member 6 may occur behind the wall. The sleeve engagement portion 12 may include, or may be in the form of, a collar. As illustrated in this embodiment, the sleeve engagement portion 12 may extend radially inwards to provide a reduced diameter at the sleeve's rear or non-exposed end. In another embodiment, the sleeve engagement portion may have a gradual decrease in diameter towards the rear or non-exposed end, in which case the sleeve engagement portion may take a frusto-conical shape narrowing towards the sleeve's rear or non-exposed end. In yet another embodiment, the sleeve engagement portion may extend inwardly but towards the sleeve's front or exposed end, in which case the sleeve engagement portion may take a frusto-conical shape narrowing towards the sleeve's front or exposed end.

Referring back to FIG. 2, the sleeve engagement portion 12 may include an aperture. The aperture may have an aperture size that is substantially the same or slightly smaller than a cross-sectional area of the penetration member 6. Furthermore, the sleeve engagement portion 12 may include a resiliently flexible portion, defining the aperture so as to allow stretched expansion of the aperture, thereby allowing the sleeve engagement portion to slip over the penetration member 6 through the aperture. For example, in FIG. 2, the aperture size is substantially the same as a cross-sectional area denoted by A of the penetration member 6, and is slightly smaller than a cross-sectional area denoted by B of the penetration member 6. With the flexibility of the flexible portion of the sleeve engagement portion 12 to stretch and expand, the sleeve 1 may slip over the portion of the penetration member 6 having the cross-sectional area denoted by B.

It should be noted that it is not necessary to seal the sleeve to the penetration member 6 in order to achieve waterproofing. This is because any leakage, for example from a failed body washer 5, would tend to drip or flow downwardly to the bottom of the sleeve 1 and then drain towards the front or exposed end of the sleeve 1. Since the aperture sits above the bottommost surface of the sleeve 1, it is unlikely that any leaked water will be so accumulated in the sleeve that the water reaches the aperture. However, to further improve the waterproofing ability of the waterproofing system and method, once the sleeve is slipped over or otherwise fitted to the penetration member 6, a sealing agent may be applied to seal the sleeve, in particular the sleeve engagement portion, to the penetration member 6.

In some embodiments, the sleeve 1 may be formed integrally with the penetration member 6. For example, the sleeve 1 may be made of the same material as the penetration member 6. For example, the sleeve 1 may be manufactured with the penetration member 6 in a single mold.

FIG. 3 illustrates the cross-section of an example of a coupling element. 3 in use. The coupling element 3 may include a flange 3a. The flange 3a may be in an annular form, which in use may be substantially aligned with the surface of the wall board or lining 7 and/or tile 8. Furthermore, the coupling element 3 may include a flange return 3b. When the coupling element 3 is in use, a surface of the flange return 3b may be substantially aligned with a surface of the sleeve 1. As exemplified in FIG. 3, the flange return surface may be complimentary to an outer surface of the sleeve 1. For example, if the sleeve is in a tubular form with a curved outer surface, the flange return surface may be curved to complement the curved outer surface of the sleeve. As illustrated in FIG. 3, once the coupling element 3 is fitted over the sleeve 1, the flange return 3b may be sealed to an outer surface of the sleeve 1.

As illustrated in FIG. 3, the coupling element 3 may be positioned against the tile 8 (or against the wall board or lining if the wall is not tiled or not yet tiled). Once the coupling element 3 is in position, the flange 3a, may be sealed to the tile 8 (or to the wall board or lining 7 if the wall is not tiled or not yet tiled) by application of a sealing agent 9. Similarly, the coupling element 3, and in particular the flange return 3b, may be sealed to the sleeve 1 by application of a sealing agent 10. Thereafter, as illustrated in FIG. 4, the sleeve 1 fitted to the penetration member 6 may be trimmed or cut, or otherwise made substantially flush with the wall. Typically a cover 13, such as a chrome plate, is then applied to cover the waterproofing system.

In another embodiment as illustrated in FIG. 5, the coupling element 3 may fit inside the sleeve 1, in which case the coupling element 3, and in particular the flange return 3b, may be sealed to an inner surface of the sleeve 1. In this embodiment, the sleeve 1 may first be trimmed, cut or otherwise made substantially flush with the wall, before the coupling element 3 is put into position, as illustrated in FIG. 5. Also, before the coupling element 3 is put into position, a sealant 10 may be applied on the inner surface towards the rear end of the sleeve 1. This sealant 10 may be applied in between the flange the sleeve 1 and the penetration member

6. The coupling element 3 may then be inserted or otherwise fit inside the sleeve 1. The coupling element 3 may be cut, trimmed or otherwise made such that the flange return 3*b* when put into position contacts the sealant 10. In effect, the coupling element 3, in particular the flange return 3*b,* may be sealed to the sleeve 1. Once in position, the coupling element 3, in particular the flange 3*a,* may be sealed to the wall board or lining 7 or the tile 8 by application of a sealing agent 9. Similarly, the coupling element 3, in particular the flange return 3*b,* may be sealed to the sleeve 1 by application of a sealing agent 10. Typically a cover 13, such as a chrome plate, is then applied to cover the waterproofing system. An advantage of this embodiment having the flange return fitted within or on the inside of the sleeve is that the wall opening does not require additional clearance for the flange return. Alternatively, it means that the sleeve has a better tolerance of its maximum diameter.

It should be apparent that by, at least initially, having the sleeve and the coupling element as separate components of the waterproofing system, it is possible to adjust the length of the sleeve as desired by, for example, reducing the length of the sleeve. If the sleeve is formed integrally with the coupling element, it would not be possible to adjust the length of the sleeve, and it would be necessary to provide waterproofing kits with different sleeve lengths to suit different depths of the water combination or water-carrying conduits. Accordingly, by initially separating the sleeve from the coupling element, a sleeve of the same length may be used regardless of the depth of the penetration member, provided that the sleeve is sufficiently long for trimming or cutting the front or exposed end of the sleeve.

Furthermore, by having the sleeve and the coupling element as separate components, the waterproofing system may provide more tolerance to a wider range of angles between the penetration member and the tile 8 or wall board or lining 7. For example, if the penetration member does not extend exactly perpendicular to the tile 8, it is envisaged that the flange 3*a* may be tilted slightly with respect to the sleeve 1, so that the flange 3*a* is substantially aligned with the tile 8 whereas the flange return 3*b* remains substantially aligned with the sleeve 1. If the sleeve is formed integrally with the coupling element, it would not be possible to tilt the flange 3*a* with respect to the sleeve 1 to provide the above tolerance. Accordingly, the coupling element may be oriented independent of the sleeve.

It should be noted that, in the embodiments shown in FIGS. 3 to 5, the coupling element 3 is to be sealed to the tile 8. In these embodiments, the waterproofing system and method may be applied to walls that are already tiled. This may be advantageous in enhancing the waterproofing of a wet area of an established property. In other embodiments, however, the coupling element may be sealed to the wall board or lining 7. In these other embodiments, all description of previous embodiments may apply, but the flange may be sandwiched between the wall board or lining 7 and the tile 8, and the coupling element should be positioned before the tile 8 is laid. These other embodiments may be applicable when a new property is being built or before a wet area is tiled or re-tiled. Furthermore, before the tile 8 is laid, a fibreglass membrane maybe applied to the wall board or lining 7 to improve waterproofing.

In yet another embodiment, as illustrated in FIGS. 6 and 7, the waterproofing system may include two coupling elements. While the first coupling element 3 may be sealed to an exposed surface of a tile 8 of a tiled wall (for example, in accordance with the description directed to FIG. 4 in which the coupling element is sealed an outer surface of the sleeve, or FIG. 5 in which the coupling element is sealed an inner surface of the sleeve), the second coupling element 2 may be sealed to a wall board or lining 7 of the wall. In other words, the second coupling element 2 is sandwiched between the tile 8 and the wall board or lining 7. As described in the previous paragraph, the second coupling element should be positioned before the tile 8 is laid. Furthermore, before the tile 8 is laid, a fibreglass membrane may be applied to the wall board or lining 7 to improve waterproofing.

Now that several embodiments of the present invention have been discussed, the way in which these embodiments of the present invention achieve waterproofing will be described. If there is any water leakage due to, for example, a failed O-ring or washer 5, the leaked water would be collected by, and at the bottom of, the sleeve 1 and would flow towards the front or exposed end of the sleeve 1. Because the rear or non-exposed end of the sleeve 1 has a narrowed diameter, the aperture of the sleeve 1 sits slightly above the bottommost surface of the sleeve 1. Any leaked water is likely to have flown towards the front or exposed end of the sleeve 1 before being accumulated to a level that reaches the aperture. As mentioned, the sleeve 1 may be sealed to the penetration member 6 to improve waterproofing. If there is a seal applied between the sleeve 1 and the penetration member 6, the leaked water would be prevented from escaping from the rear or non-exposed end the sleeve 1 and from seeping behind the wall, even if any leaked water is accumulated to a level that reaches the aperture.

Furthermore, because of the sealing between the flange 3*a* and the wall board or lining 7 or tile 8, any water external to the wall (e.g. water from a person showering in the shower recess) would not be able to seep behind the tile or the wall.

In the event where the O-ring or body washer 5 fails and needs repair or replacement, the body 16 may be removed without the need to remove any sealant in order for the repair or replacement of the O-ring or body washer 5 to take place.

Furthermore, the second coupling element 2 may improve the waterproofing system in areas, such as a shower recess, where water may seep through the grout or grout line between the tiles 8 and reaches the space between the tile 8 and the wall board or lining 7. In the absence of the second coupling element 2, this leaked water may run along the direction indicated by arrow C in FIG. 7, reaching down to the sleeve 1 and escaping behind the wall board and lining 7. With the second coupling element 2, however, the leaked water would not be able to escape behind the wall board or lining 7 and would stay within the space between tile 8 and the wall board and lining 7.

In order to facilitate drainage of any leakage, the coupling element 3 may be designed to separate the cover 13 from the tile 8, thereby leaving room for draining the leaked water. For example, in a further embodiment as illustrated in FIG. 8*a,* the coupling element 3 may include one or more lugs or tabs 14 for raising or lifting the cover (not shown) slightly when the cover is in place. It is envisaged that, when the coupling element 3 is in use, the one or more lugs or tabs 14 may be positioned in the lower half of the flange 3*a,* for example at 5 and 7 o'clock positions, to facilitate draining along the bottom portion of the flange 3*a.* Alternatively, in yet a further embodiment as illustrated in FIG. 8*b,* the coupling element 3 may include one or more depressed channels 15. The depressed channels 15 may have a thickness less than that of the rest of the flange 3*a,* thereby providing room for the leaked water to drain. Again, when the coupling element 3 is in use, the depressed channels 15 may be positioned in the lower half of the flange to facilitate draining along the bottom portion of the flange 3*a.* In a third aspect of the present invention, there is a provided a method of waterproofing a tiled wall having an opening through which a penetration member extends. In its most general form, the method comprises the steps of fitting a sleeve to the penetration member, the sleeve being coupled to a flange adapted to be sealed to an exposed surface of the tiled wall, and sealing the flange to the exposed surface of the tiled wall. The sleeve may be formed integrally with the flange, in which case there is no need for a flange return since there is no need for any sealing between the flange and the sleeve. This aspect of the invention may be directed waterproofing a tiled wall. To enhance the waterproofing, the sleeve may be sealed to the penetration member.

From the foregoing discussion, it should be apparent to a skilled person in the art that the present invention has the following advantages:

- With the coupling element and the sleeve being initially separated, the sleeve may be cut, trimmed or otherwise adjusted to an appropriate length (for example, substantially flush with a wall) to suit the depth of the penetration member. The same sleeve may be used regardless of the depth of the penetration member.
- With the coupling element and the sleeve being initially separated, it may also provide greater tolerance to the variation of the angle between the penetration member and the wall.
- In comparison to conventional waterproofing, less sealant is required or the need to fill the entire gap between a penetration member and the wall is obviated.
- If any portion of a penetration member, such as the body rotatably coupled to a tap spindle, needs to be removed for repair or maintenance purposes, it can be done so without the need to remove any sealant.
- In a dual-flange or dual-coupling-element arrangement, any water seeped through the grout between the tiles will be unable to flow behind the wall board or lining.

Those skilled in the art will appreciate that the invention described herein is susceptible to variations and modifications other than those specifically described. Variations and modifications are to be considered within the ambit of the present invention the nature of which is to be determined from the foregoing description.

The invention claimed is:

1. A method for waterproofing a wall having a wall opening through which a water combination extends, the method comprising the steps of:
    fitting a sleeve including a resiliently flexible and integral collar to the water combination, the integral collar being:
    (i) inserted through the wall opening; and
    (ii) expanded to fit about the water combination;
        adjusting the sleeve by trimming or cutting the sleeve substantially flush with the wall;
        fitting a coupling element including an annular flange, separate from the sleeve, to the sleeve;
        aligning the annular flange with a surface of the wall;
        sealing the annular flange to the surface of the wall.

2. A method as claimed in claim 1 wherein the step of fitting a coupling element involves sealing the coupling element to the sleeve.

3. A method as claimed in claim 1 wherein the step of fitting a coupling element involves fitting a flange return of the coupling element inside the sleeve.

4. A method as claimed in claim 3 also comprising the step of trimming or cutting the flange return, depending on a length to which the sleeve is adjusted, prior to fitting the flange return of the coupling element inside the sleeve.

5. A method for waterproofing a wall having a wall opening through which a water combination extends, the method comprising the steps of:
    fitting a sleeve including a resiliently flexible and integral collar to the water combination, the integral collar being:
    (i) inserted through the wall opening; and
    (ii) expanded to fit about the water combination;
        fitting a coupling element including an annular flange, separate from the sleeve, to the sleeve;
        aligning the annular flange with a surface of the wall;
        sealing the annular flange to the surface of the wall;
        adjusting the sleeve by trimming or cutting the sleeve substantially flush with the wall.

6. A method as claimed in claim 5 wherein the step of fitting a coupling element involves sealing the coupling element to the sleeve.

7. A method as claimed in claim 5 wherein the step of fitting a coupling element involves fitting a flange return of the coupling element outside the sleeve.

* * * * *